United States Patent [19]

Rogers

[11] Patent Number: 5,738,481
[45] Date of Patent: Apr. 14, 1998

[54] UNIVERSALLY ACTUABLE ROBOT ASSEMBLY

[76] Inventor: Vincent Rogers, 44155 Bayview Ave., Clinton Township, Mich. 48038

[21] Appl. No.: 759,315

[22] Filed: Dec. 2, 1996

[51] Int. Cl.$^6$ ............................................ B25J 5/00
[52] U.S. Cl. ........................ 414/744.6; 414/749; 901/1
[58] Field of Search .................. 414/749, 744.2, 414/744.6, 729; 901/1, 16, 17, 18, 21, 28, 29; 74/490.05, 490.06

[56] References Cited

U.S. PATENT DOCUMENTS

| | | |
|---|---|---|
| 3,665,148 | 5/1972 | Yasenchak et al. . |
| 4,299,529 | 11/1981 | Inaba et al. . |
| 4,319,864 | 3/1982 | Kaufeldt ........................ 901/21 X |
| 4,502,830 | 3/1985 | Inaba et al. . |
| 4,569,627 | 2/1986 | Rouse et al. . |
| 4,636,137 | 1/1987 | Lemelson ........................ 901/1 X |
| 4,642,021 | 2/1987 | Kikuchi . |
| 4,657,104 | 4/1987 | Holland . |
| 4,676,713 | 6/1987 | Voelpel ........................ 901/1 X |
| 4,732,525 | 3/1988 | Neumann . |
| 4,739,241 | 4/1988 | Vachtsevanos et al. .............. 901/29 X |
| 4,762,261 | 8/1988 | Hawly et al. . |
| 4,787,262 | 11/1988 | Kozawa et al. . |
| 4,819,496 | 4/1989 | Shelef . |
| 4,821,594 | 4/1989 | Rosheim et al. . |
| 4,848,179 | 7/1989 | Ubhayakar . |
| 4,919,382 | 4/1990 | Forman . |
| 5,053,687 | 10/1991 | Merlet . |
| 5,088,171 | 2/1992 | Suzuki . |
| 5,103,403 | 4/1992 | Ch'Hayder et al. . |
| 5,129,279 | 7/1992 | Rennex . |
| 5,157,316 | 10/1992 | Glovier . |

FOREIGN PATENT DOCUMENTS

| | | |
|---|---|---|
| 0112099 | 6/1984 | European Pat. Off. . |
| 214564 | 10/1984 | Germany . |
| 1049244A | 10/1983 | U.S.S.R. . |
| 1303398A | 4/1987 | U.S.S.R. . |
| 2083795 | 3/1982 | United Kingdom . |

*Primary Examiner*—Donald W. Underwood
*Attorney, Agent, or Firm*—Gifford, Krass, Groh, Sprinkle, Patmore, Anderson & Citkowski,P.C.

[57] ABSTRACT

An improved universally actuable robot assembly including a pedestal support base and a body which is swivelably mounted and rotatably driven around the base. A main support arm extends substantially horizontally from the body at a generally centralized location and terminates in a first universally swivelable member which is mounted to a first face of a vertically orientated intermediate plate member. A selected number of linearly actuable driving arms extend from the body in parallel fashion relative to the main support arm and at preselected spaced apart distances. The driving arms each include a linearly actuable cylinder for adjusting an overall length of an associated driving arm. A linearly extending engaging member is secured to and extends from a second face of the intermediate plate member and the plate member is responsive to manipulative motion of the driving arms in a universal manner about a pivot point established by the main support arm to universally position the engaging member.

13 Claims, 4 Drawing Sheets

UNIVERSALLY ACTUABLE ROBOT ASSEMBLY

BACKGROUND OF THE INVENTION

1. Field of the Invention

The present invention relates generally to actuable robot assemblies having varying degrees of motion, including linear, rotational and universal, along differing numbers of axes and, more particularly, to an improved robot assembly capable of rotational and/or translational motion in combination with a universally actuable driving motion of a pedestal mounted grabbing or gripping member.

2. Description of the Prior Art

Multiple axis manipulatable robotic assemblies are fairly well known in the art which are provided for the purpose of establishing a repetitive manufacturing or assembly function of some type. In the majority of instances, such robotic assemblies are numerically controlled by some form of external or built-in computerized command module for the purpose of establishing guideline parameters for robotic motion sequence.

An example of a conventional industrial robot is set forth in U.S. Pat. No. 4,502,830, issued to Inaba et al., which teaches a trunk mounted for vertical and rotational movement on a stationary base. Two arm members are extensible from the trunk having a robot wrist mechanism attached to their ends. The extending and contracting movement of the arm members, rotational movement of the wrist and swinging movement of the wrist are controlled, respectively, by three electric servo motors mounted to a side of the assembly.

U.S. Pat. No. 3,665,148, issued to Yasenchak et al., teaches a six-axis manipulator for positioning a work head with respect to articles moving on an assembly line. The manipulator is provided with up to six degrees of freedom including three perpendicular rectilinear axes and three rotational axes. A combination of electro servo motors and precision ball screw drives coordinate to position a workhead about a rectilinear axis and a chain drive and differential gear unit universally position the workhead about the rotational axes for achieving secondary orientation in a desired work processing relationship with the articles of manufacture.

Soviet Patent, Reference No. SU 1303-398-A, discloses a spatial multi-coordinate mechanism for providing faster response and includes a plurality of pivotally associated tie members extending from a fixed surface and connecting at desired locations to a three dimensional member having mutually perpendicular axes. The pivots are set in pairs at opposite ends of the three axes and the length of any one or any number of pivot members is adjustable by pneumatic or hydraulic cylinders.

While disclosing effective robotic assemblies for particular applications, the prior art fails to teach a robot assembly which is capable of heavy-duty supported universally actuable motion in combination with select rotational and/or translational motion and which is further numerically programmed to function in a number of different capacities.

SUMMARY OF THE PRESENT INVENTION

The present invention is an improved universally actuable robot assembly which is capable of providing heavy-duty and universally supported motion of a linearly extending engaging member in combination with select rotational and/or translational motion. A pedestal support base is provided and a body is swivelably mounted atop the support base by a bearing incorporated into the base.

Means are provided for driving the body in a rotating manner about the pedestal support base and include an electric spin motor assembly encased within a motor housing and mounted to the body. A rotatably driven output shaft is operatively connected to the electric motor assembly and extends downwardly therefrom. A rotary engaging member is mounted to a downwardly extending end of the output shaft and engages an intermediate portion of the pedestal support base which is substantially circular in cross section. In one preferred embodiment, the rotary engaging member is a disc-shaped portion having a rubberized friction creating outer track surface which creates a frictional engaging contact with a smooth circular face of the intermediate portion of the pedestal base. In another preferred embodiment, the rotary engaging member is a first toothed gear member and the intermediate body portion of the pedestal base also includes a second toothed gear extending around a circumference thereof which is engaged by the first gear to swivelably rotate the body relative to the base.

The body portion of the assembly includes a main support arm extending substantially horizontally from the body at a generally centralized location and terminating in a first universally swivelable member which connects to a first face of a generally vertically oriented intermediate plate member. According to a preferred embodiment, a first pair of first and second linearly extending and actuable driving arms extend from the body in a generally parallel fashion below and to the sides of the main support arm. The first and second driving arms each further include a linearly actuable cylinder for adjusting an overall length of the associated driving arm and also include first and second pairs of universally swivelable members connecting to the first face of the intermediate plate member.

A linearly extending engaging member extends from a second face of the intermediate plate member and terminates in a gripping member. The plate member is responsive to manipulative motion resulting from the inward and outward actuation of the driving arms by the cylinders in a universal manner about a pivot point established by the main support arm to universally position the engaging member and gripping end member in a desired manner. According to a further preferred embodiment, an additional pair of third and fourth linearly actuable driving arms extend from the body in a likewise generally parallel fashion and at opposite sides upwardly of the main support arm. The option of employing first and second pairs of linearly actuable driving arms permits an even greater degree of universally supported motion of the engaging member and enables the transport of even heavier and/or builder articles than is provided by the variant in which a single pair of linearly actuated driving arms are employed.

The present invention further provides an optional linear carriage assembly which includes a belt loop attaching to an underside of the pedestal support base and having forward and rearward positioned rollers. The belt loop is in operative engagement with a linear actuating motor so as to be capable of being driven in a forward and rearward linear direction to linearly translate the robot assembly. The linearly extending member further terminates in a gripping member according to some desired construction and the gripping member is further capable of being rotatingly or universally mounted to the end of the extending member as desired and according to specific operating parameters.

BRIEF DESCRIPTIONS OF THE DRAWINGS

Reference will now be made to the attached drawings, when read in combination with the following specification, wherein like reference numerals refer to like parts throughout the several views, and in which.

DESCRIPTION OF THE PREFERRED EMBODIMENTS

Figure 1:
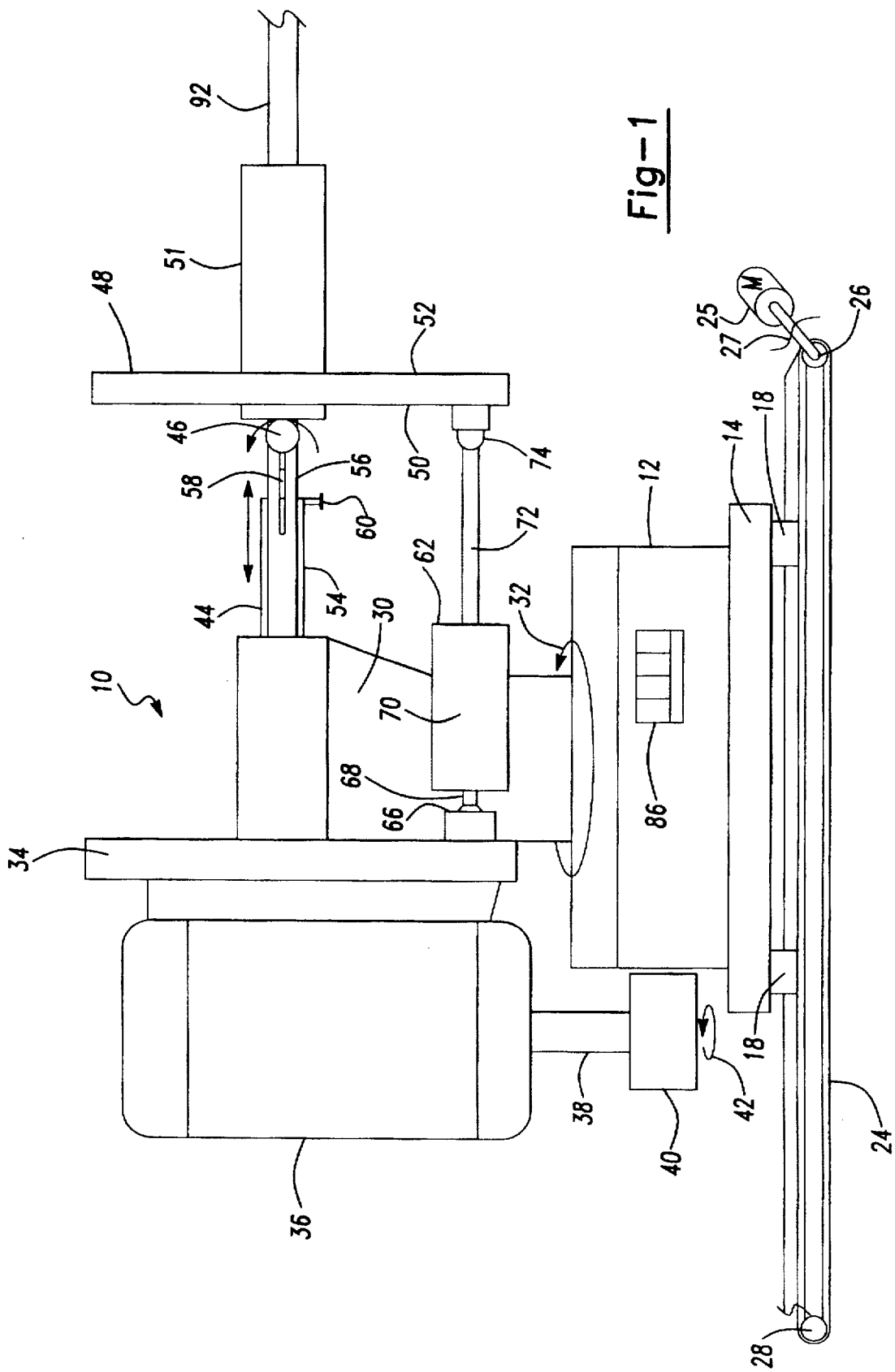
FIG. 1 is an overall view of the universally actuable robot assembly according to a first preferred embodiment of the present invention.

Referring now to FIG. 1, an improved universally actuable robot assembly 10 is shown according to a first preferred embodiment of the present invention for permitting repetitive transfer movement of all types of articles of manufacture, including specifically heavy and bulky articles. In the first preferred embodiment the assembly 10 includes a pedestal support base 12 which is preferably circular in cross section as is further evident with reference to FIG. 2 and which is mounted atop a linear carriage assembly 14.

Referring again to FIGS. 1 and 2, the linear carriage assembly 14 includes a substantially rectangular base which provides a platform upon which the pedestal support 12 is welded or otherwise fixedly attached. A first pair of channel guides 16 are provided at opposite ends of a first side of the carriage assembly 14 base and a second pair of channel guides 18 are provided at opposite ends of a second opposing side. Extending in a parallel and spaced apart manner is a pair of extending guide rails 20 and 22 which are received through the pairs of channel guides 16 and 18 and which permit the carriage assembly to linearly transport in forward and rearward translational directions. In one preferred variation, the linear carriage assembly 14 further includes a heavy duty belt loop 24 to which an underside of the rectangular base is fixedly secured and which is operable by a motor drive 25 to forwardly and rearwardly translate the carriage assembly. Referring specifically to FIG. 1, a first roller member 26 is provided at a forward end of the belt loop 24 which is operatively connected to the motor 25 by a drive shaft 27 and a second roller member 28 is likewise provided at a rearward end of the loop 26 to facilitate the translating motion of the carriage assembly. Any other type of conventional motor driven means may also be employed in the art for the purpose of linearly actuating the carriage assembly in both forward and rearward directions.

Referring again to FIGS. 1 and 2, a body 30 extends generally upwardly from the pedestal base support 12 and is swivelably secured to the base 12 by a conventional bearing assembly or similar swivelably attaching means (not shown) so that the body 30 can rotate in the direction of the arrow 32 illustrated in FIG. 1. Secured to and extending substantially upwardly from the body 30 is a generally vertically positioned plate 34 and mounted to extend in a rearward direction from the plate 34 is an electric spin motor assembly 36. The spin motor assembly 36 is encased within a motor housing as illustrated in the drawings and includes a rotatably driven output shaft 38 operatively connected to the electric motor assembly and extending downwardly from the motor housing. A rotary engaging member is mounted to an end of the output shaft 38 and, according to a first preferred variant, is a disc-shaped member 40 (see FIG. 1) with a rubberized friction creating outer track surface. The disc-shaped member 40 is rotated by the spin motor in a desired rotational direction, identified by arrow 42, and in frictional engagement with the circular outer track of the pedestal support base (see also FIG. 2) so that the body 30 secured to the motor and swivelably mounted to the pedestal support surface 12 will rotate in the specified direction.

In addition to the above disclosure relating to both linear translational and rotational capabilities of the robot assembly, a novel and unique universal actuating means is also provided and is now described. A main support arm 44 extends in a generally linear fashion forwardly of the body 30 and terminates in a first universally swivelable member 46 which in turn is secured to a generally vertically oriented intermediate plate member 48. The first universally swivelable member 46, as well as additional swivelable members which will be subsequently described, are each conventionally provided by ball and socket assemblies which provide the necessary degree of universal motion as well as heavy duty support. The plate member 48 is generally square or circular in shape and includes a first face 50 and a second face 52 and the first swivelable member 46 is secured to a generally centralized location of the plate member 48. Also provided is an intermediate bracing member 51 which may extend through the plate member 48 from the first face 50 which secures the first swivelable member 46 to a forwardly extending end beyond the second face 52. An overall length of the main support arm 44 may further be modified by separating the support arm into first and second telescoping members 54 and 56 and by incorporating a sliding track or plurality of spaced apertures, FIG. 1 showing a sliding track 58, and a pin 60 arrangement between the telescoping members so that the second telescoping member 56 may be repositioned at a desired linear location relative to the first telescoping member 54 and the pin inserted to fixedly secure the main support arm 44 in place.

Referring again to FIGS. 1 and 2, a first pair of a first linearly actuable driving arm assembly 62 and a second linearly actuable driving arm assembly 64 are provided in parallel fashion and at spaced apart distances from the main support arm 44. According to the first preferred embodiment, the first and second driving arm assemblies 64 and 66 are positioned at opposite spaced sides and below the main support arm and function to manipulate universal motion of the intermediate plate member 48 about the first universally swivelable member 46. The first driving arm assembly 62 includes a first universally swivelable member 66 secured to a first lower and side position of the vertically positioned plate 34 of the body 30 relative to the main support arm 44. A first shaft portion 68 is integrally formed with the swivelable member 66 extends forwardly to secure to a first end of a first linearly actuable cylinder 70. A second shaft portion 72 extends from a forward end of the cylinder 70 and the cylinder 70 may further be fluidly actuated, such as with pneumatics or hydraulics, to forwardly and rearwardly translate the second shaft portion 72 inwardly and outwardly. The second shaft portion 72 terminates in a second universally swivelable member 74 which is mounted to the first face of the intermediate member 48 in a likewise lower and side position relative to the swivelable connection 46 of the main support arm 44.

Figure 2:
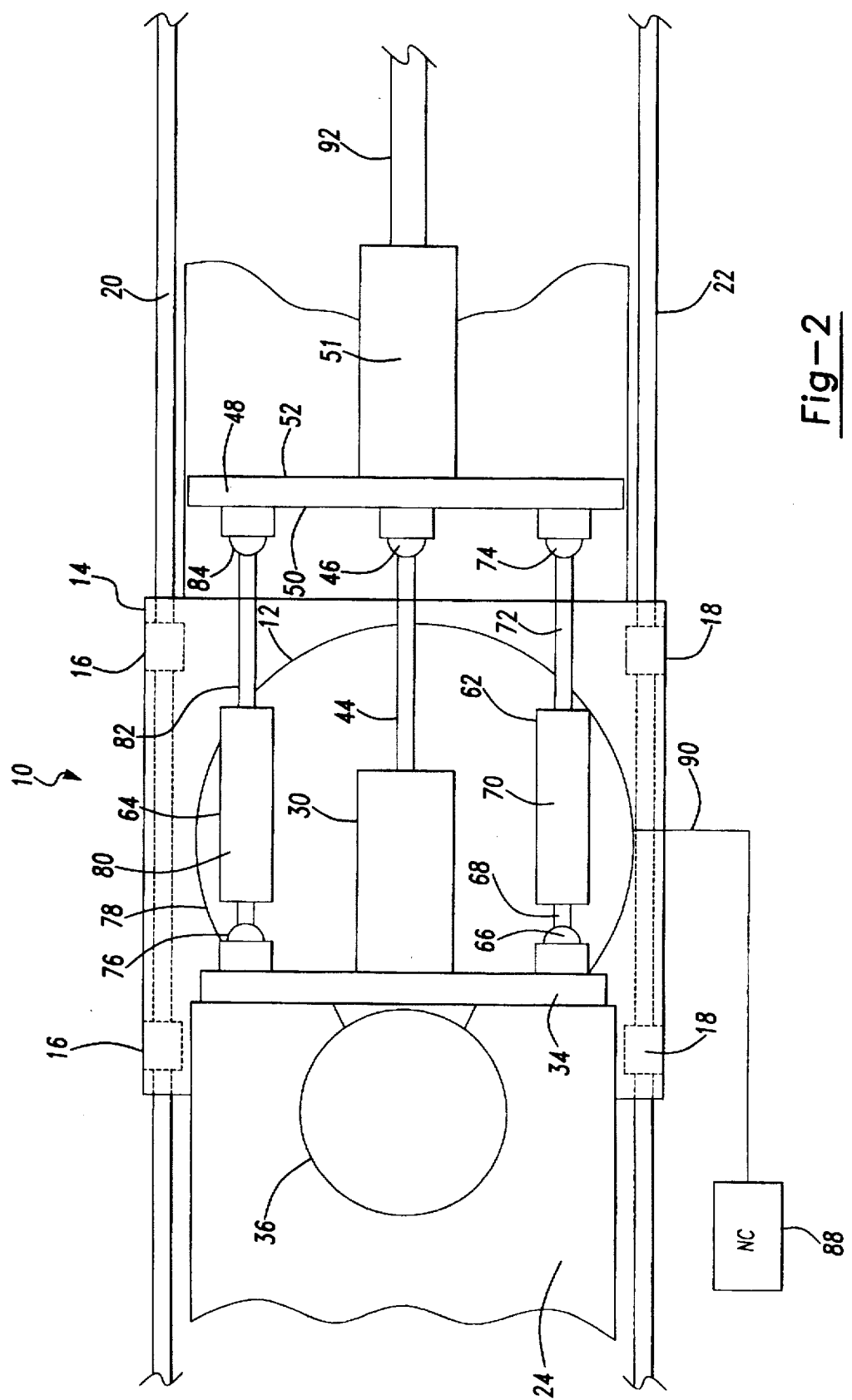
FIG. 2 is a top view of the universally actuable robot assembly as substantially shown in FIG. 1 and further illustrating the linear carriage assembly according to the first preferred embodiment.

Only the first driving arm assembly 62 is shown in the side view of FIG. 1, however FIG. 2 also illustrates in the top view the second driving arm assembly 64 which likewise includes a first swivelable member 76, a first shaft portion 78 integrally extending from the first swivelable member 76 and securing to a first end of a second linearly actuable cylinder 80. A second shaft portion 82 extends from a forward end of the cylinder 80 and terminates in a second universally swivelable member 84 which is also mounted to the first face of the intermediate plate member 48 in a lower and opposing side position relative to the main support arm 44 and swivelable member 46.

The first and second driving arm assemblies 62 and 64 are operated by a numerical control unit 86 attached to the assembly as illustrated in FIG. 1 or a similar unit 88 which is mounted at a remote location as shown in FIG. 2 and which is connected to an input of the assembly by a conduit line 90. The numerical control unit may be of any type as is conventionally known in the art and operates to manipulate the first and second driving arm assemblies in a simultaneous and controlled fashion to pivot the plate member 48 about a universal axis extending through the first universally swivelable pivot 46 of the main support arm 44. The first swivelable members 66 and 76 and second swivelable members 74 and 84 further form first and second pairs of swivelable members for enabling independent and universal motion of the first and second driving arm assemblies. The numerical control units, according to either the variants 86 or 88, are also capable of actuating both the linear carriage assembly and/or the swivelably rotational motion of the body relative to the pedestal support base by control means which are also conventionally known in the art.

Referring again to FIGS. 1 and 2, the forwardly projecting bracing member 51 is integrally formed with a linearly extending engaging member 92 for effectuating transfer of desired articles. The linearly extending members 92 in FIGS. 1 and 2 are illustrated to only a certain extent and, referring to FIGS. 5a and 5b, gripping assemblies are illustrated according to certain known embodiments for grabbing and transferring conventional manufactured articles. According to FIG. 5a, a linearly extending engaging member 92' according to one preferred variant terminates in a gripping member 94 constructed of first and second jaw portions 96 and 98 which open and close in the direction of an arrow 100. The gripping member 94 is further rotatably secured to the linearly extending member 92' as illustrated by movement line 102 and the provision of such a rotational axis of freedom is desirable in many numerically controlled transfer motions.

Figure 5A:
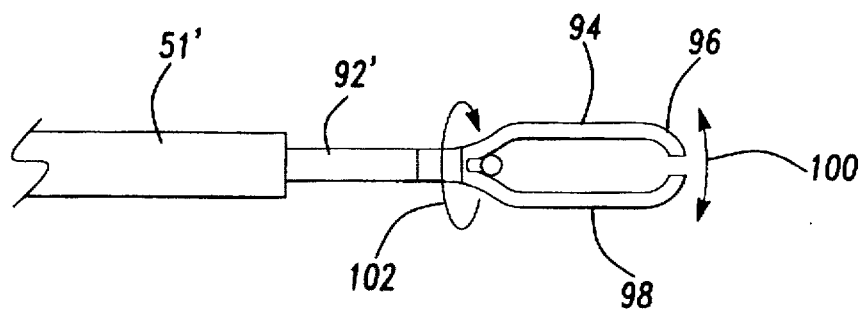
FIG. 5a is a sectional view of the linearly extending engaging member terminating in a gripping member according to a further variant.
Figure 5B:
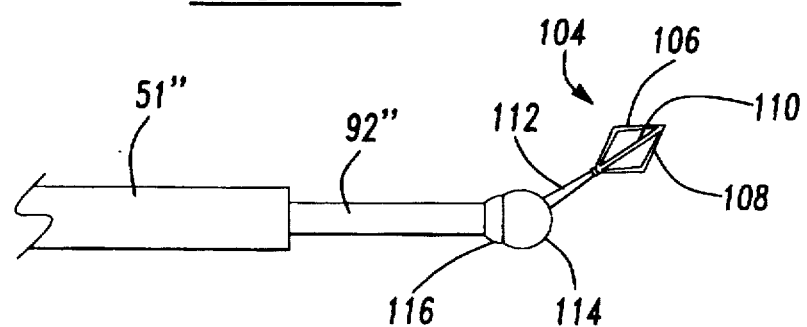
FIG. 5b is a sectional view of the linearly extending engaging member terminating in a gripping member according to a still yet further variant.

According to FIG. 5b, a linearly extending engaging member 92" according to another preferred variant terminates in a gripping member 104 which is constructed of first 106, second 108 and third 110 finger portions which are opened and closed to grip more bulky or non-conventionally configured articles (also not shown). An arm portion 112 extends from a base connection of the finger portions and terminates in an integrally formed universal ball 114. The ball 114 is mounted within a like configured open end receptacle 116 of the engaging member 92" and permits an additional degree of universal movement for translating articles. The gripping members as described in FIGS. 5a and 5b are merely representative of some possible configurations which are known in the art and description of them is intended only to provide additional disclosure and not to limit in any way the universally manipulatable concept of the present invention.

Figure 3:
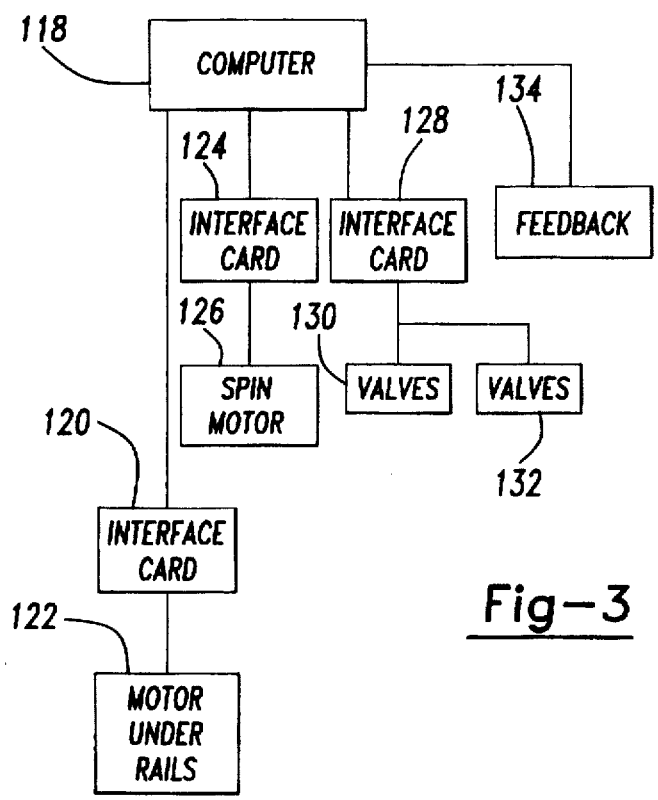
FIG. 3 is a control scheme employed by a numerical control unit operatively connected to the robot assembly of the present invention and capable of actuating linear translating, rotating and universally movable elements of the present invention.

Referring now to FIG. 3, a control scheme is illustrated for the numerical control unit according to the present invention and includes a computerized device of sorts 118 which communicates with a first interface card 120 to operate a motor underneath the rails of the linear carriage assembly, illustrated at step 122. The device 118 further connects by a second interface card 124 with the spin motor at step 126 to control the rotational motion of the body relative to the pedestal base support. Finally, a third interface card 128 interconnects the device 118 with first and second valves 130 and 132 which are incorporated into the cylinders of the driving arm assemblies in the embodiment of FIGS. 1 and 2 to actuate the inward and outward linear translation of the second shaft portions and, in concert, to manipulate the intermediate plate member in the universal fashion. A feedback step 134 is also illustrated and permits the operator to monitor conditions and/or parameters which are established to guarantee proper operation of the assembly.

Figure 4:
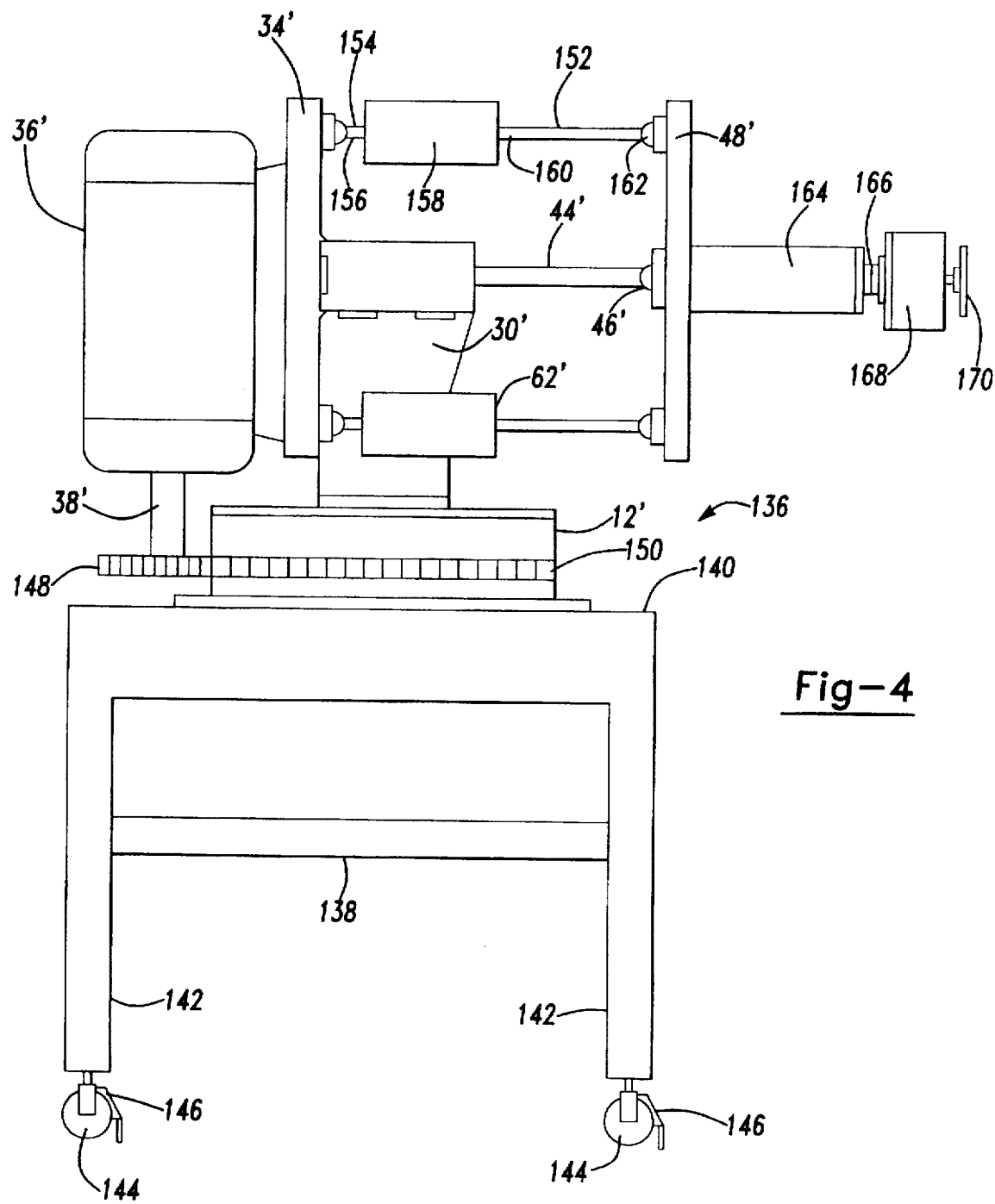
FIG. 4 is an overall view of the universally actuable robot assembly according to a second preferred embodiment of the present invention.

Referring finally to FIG. 4, a universally actuable robot assembly 136 is illustrated according to a second preferred embodiment of the present invention and includes a roller supported table unit 138 upon which a pedestal support base 12' is mounted. The table unit 138 includes further downwardly extending legs, illustrated in two-dimension as legs 142, and rollers 144 extending from the bottom of the legs 142. In order to lock the rollers 144 in place once the table unit 138 is position in the desired location, locking members 146 may also be provided. The provision of the table unit 138 is meant to replace the linear carriage assembly disclosed in the embodiment of FIGS. 1 and 2 and the assembly 136 according to this embodiment is utilized where no substantial degree of linear translating motion during the repetitive part transfer cycle is required.

The robot assembly 136 according to the second preferred embodiment includes an upwardly extending and swivelable mounted body 30' as similarly disclosed in the first embodiment as well as an integrally formed and vertically extending plate 34' and a spin motor and housing assembly 36' with downwardly extending shaft portion 38'. The means for rotatably driving the body 30' relative to the base 12' differs however in this embodiment and includes the rotary engaging member mounted to the bottom of the shaft portion 38' being a first toothed gear 148 which is in intermeshing contact with a second toothed gear 150 which forms an intermediate body portion of the pedestal support base and which forms a generally circular shaped outer periphery of the support base. The intermeshing gear arrangement permits the body 30' to be rotating in a controlled manner atop the base and is intended as an alternative option to the arrangement set forth in the first preferred embodiment.

Referring again to FIG. 4, the universally actuating assembly likewise includes a main support arm 44' with a first universally swivelable member 46' connected to an intermediate support plate 48'. Likewise, first and second driving arm assemblies, illustrated in side profile by first driving arm assembly 62', with the second driving arm included but hidden from view, are secured at opposite sides and below the main support arm 44' as taught by the first preferred embodiment and form a first pair of driving assemblies.

The embodiment of FIG. 4 further includes a third driving arm assembly and a fourth driving arm assembly which form a second pair of driving assemblies and which are mounted to extend from the body in parallel fashion above and to the sides of the main support arm and to secure to the intermediate plate member at likewise elevated and side positions. Only one of the third and fourth driving arm assemblies, illustrated at 152, is shown in FIG. 4 however it is understood that they form a second likewise pair in comparison to the first pair 62' and 64'. The third and fourth assemblies are identical constructed and each includes a first swivelable member 154, first shaft portion 156, cylinder actuating member 158, second shaft portion 160 and second swivelable member 162 to provide an additional pair of driving arm assemblies to manipulate the intermediate plate member about the fixed universal pivotal connection provided by the main support arm. The advantage of the additional pair of driving arm assemblies as is provided by this embodiment is to allow for the transfer of larger, heavier and/or bulkier articles than which could be provided by an assembly according to the first preferred embodiment.

An additional cylinder member 164 is integrally formed with and extends linearly forwardly of the intermediate plate member and includes a square metal flange tubing 166 extending therefrom. A unit 168 can include a portable stepping motor and is attached at a forward end of the tubing 166. An element 170 having a generally vertical face is further attached at a forward end of a shaft extending from the unit 168.

It is therefore evident that the present invention teaches a novel and unique universally actuable robot assembly. Additional embodiments will become apparent to those skilled in the art to which it pertains without deviating from the scope of the appended claims.

I claim:

1. An improved universally actuable robot assembly, comprising:
   a pedestal base support;
   a body swivelably mounted atop said pedestal base support and means for driving said body in a rotating manner about said base;
   a linearly extending engaging member and means for universally actuating said engaging member, said universally actuating means comprising:
   a main support arm extending substantially horizontally from said body at a generally centralized location, said main support arm terminating in a first universally swivelable member which connects to a first face of a generally vertically oriented intermediate plate member; and
   at least first and second linearly actuable driving arms extending from said body in generally parallel fashion and at spaced apart distances with respect to said main support arm and connecting via a first pair of forwardly positioned universally swivelable members to said first face of said intermediate plate member at first and second spaced locations from said first universally swivelable member of said main support arm, a first and a second linearly actuable cylinder pivotally mounted to said body by a second pair of rearwardly positioned universally swivelable members and receiving said first and second driving arms, respectively, for adjusting an overall length of said driving arms;
   said linearly extending engaging member fixedly secured to and extending from a second face of said intermediate plate member and said plate member being responsive to manipulative motion of said driving arms in a universal manner about a pivot point established by said main support arm to universally position said engaging member.

2. The universally actuable robot assembly as described in claim 1, further comprising a linear carriage assembly upon which said pedestal support base is mounted, said carriage assembly further including a pair of parallel extending rails upon which said pedestal support base translates in a forward and rearward direction.

3. The universally actuable robot assembly as described in claim 2, said linear carriage assembly further comprising a belt loop attaching to an underside of said pedestal support base and to which said pedestal support base is fixedly secured, a motor drive being in operative engagement with said carriage assembly so as to linearly actuate said carriage assembly in forward and rearward directions by a first roller member located at a forward end and a second roller member located at a rearward end thereof.

4. The universally actuable robot assembly as described in claim 1, said means for driving said body in a rotating manner about said pedestal support base further comprising:
   an electric spin motor assembly encased within a motor housing and mounted to said body;
   a rotatably driven output shaft operatively connected to said electric motor assembly and extending downwardly from said motor housing; and
   a rotary engaging member mounted to an end of said output shaft, said rotary engaging member engaging an intermediate portion of said pedestal support base which is substantially circular in cross section;
   said rotary engaging member being rotatably driven by said electric motor assembly to rotatably reposition said body at a desired angular increment.

5. The universally actuable robot assembly as described in claim 4, said rotary engaging member further comprising a disc-shaped member with a rubberized friction creating outer track surface, said outer track surface creating a frictional contact with a smooth circular face of said intermediate portion of said pedestal support base.

6. The universally actuable robot assembly as described in claim 4, said rotary engaging member further comprising a first toothed gear, said intermediate portion of said pedestal support base comprising a second toothed gear which is engaged by said first gear to swivelably rotate said body relative to said base.

7. The universally actuable robot assembly as described in claim 1, further comprising a roller-supported table unit upon which said pedestal support base is secured.

8. The universally actuable robot assembly as described in claim 2, further comprising a programmable numerical control unit for establishing an operating sequence for at least one of said linear carriage assembly, said at least first and second linearly actuable driving arms and said means for driving said body in a rotating manner about said pedestal support base.

9. The universally actuable robot assembly as described in claim 1, said first and second linearly actuable driving arms being positioned at evenly distanced locations at opposite sides of and below said main support arm, said assembly further comprising third and fourth linearly actuable driving arms extending from said body in generally parallel fashion and at opposite sides of and above said main support arm, said third and fourth driving arms connecting via a third pair of universally swivelable members to said first face of said intermediate plate member.

10. The universally actuable robot assembly as described in claim 1, further comprising means for adjusting an overall length of said main support arm, said adjusting means including said main support arm comprising first and second telescoping members and a sliding track and pin arrangement enabling said second telescoping member to reposition relative to said first telescoping member so as to reposition said first universally swivelable member attaching to said intermediate plate member.

11. The universally actuable robot assembly as described in claim 1, further comprising a gripping member secured to and extending from a projecting end of said linearly extending engaging member.

12. The universally actuable robot assembly as described in claim 11, further comprising means for rotatably securing said gripping member to said engaging member.

13. The universally actuable robot assembly as described in claim 11, further comprising means for universally securing said gripping member to said engaging member.

* * * * *